(12) United States Patent
Morrill (10) Patent No.: US 8,345,705 B2
(45) Date of Patent: Jan. 1, 2013

(54) METHOD AND APPARATUS FOR CONDUCTING ANALOG COMMUNICATION OVER A DATA CABLE

(75) Inventor: Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1495 days.

(21) Appl. No.: 11/904,921

(22) Filed: Sep. 28, 2007

(65) Prior Publication Data

US 2009/0086955 A1 Apr. 2, 2009

(51) Int. Cl.
*H04L 12/66* (2006.01)
(52) U.S. Cl. .................................. 370/463; 370/352
(58) Field of Classification Search .................. None
See application file for complete search history.

(56) References Cited

U.S. PATENT DOCUMENTS

| 2002/0024591 A1* | 2/2002 | Fenouil ................. 348/14.09 |
| 2005/0117603 A1* | 6/2005 | Binder ...................... 370/466 |
| 2006/0182094 A1* | 8/2006 | Binder ...................... 370/352 |

* cited by examiner

Primary Examiner — David Oveissi
(74) Attorney, Agent, or Firm — Patton Boggs LLP

(57) ABSTRACT

A method and apparatus for conducting analog communication are provided. A first set of wires carrying a data signal is coupled to a data network. A second set of wires carrying an analog signal is coupled to an analog communication network. A single connector is coupled to the first and second sets of wires. A port in a communication device is coupled to the connector. The communication device communicates the data signal and the analog signal over the first and second sets of wires respectively. The second set of wires may be separate from the first set. The second set of wires may be a subset of the first set, in which case, a filter filters an incoming analog signal from an incoming signal on the second set of wires. A multiplexer multiplexes an outgoing analog signal with an outgoing data signal on the second set of wires.

3 Claims, 5 Drawing Sheets

METHOD AND APPARATUS FOR CONDUCTING ANALOG COMMUNICATION OVER A DATA CABLE

BACKGROUND

1. Field of the Invention

The principles of the present invention relate generally to an improved communication device, and in particular, to connecting a communication device. Still more particularly, the principles of the present invention relate to a method and apparatus for conducting analog communication over a data cable.

2. Description of the Related Art

Telecommunication involves two or more communication devices communicating with each other using a communication network. For example, two telephones may be able to communicate with each other using a telecommunication network called public switched telephone network (PSTN). PSTN is primarily a voice telecommunication network for enabling telephone-based telecommunication between two or more parties.

Conventional telecommunication methods, such as telecommunication using a conventional telephone, convert sound waves of a speaker's voice into analog signals, and carry the analog signals over networks to a destination, such as to a destination telephone. Analog signals, including analog electrical signals, are signals that are time-continuous such that a signal may have any value at a given time, as opposed to a discrete value for a duration of time. A network that facilitates telecommunication is a communication network. A communication network that facilitates telecommunication using analog signals is an analog communication network PSTN is an example of an analog communication network.

A communication device is a device from which a telecommunication call may be placed or received. The term "communication devices" refers to the collection of all devices used for telecommunication. For example, a communication device can be the familiar telephone, a computer with a telecommunication enabling software application, a telephone-like device that works over data networks instead of a plain old telephone system (POTS) line, a wireless or cellular phone, or any other device used for telecommunication. A communication device is any one of these communication devices. Communication devices may also include devices and applications capable of communicating in other ways, for example, by text messaging, instant messaging including text, audio, video, images, and documents.

Data processing systems are often connected with other devices and data processing systems using a data network. The data network provides the networked data processing systems and devices with a communications medium over which data may be exchanged with each other.

Many types of wired and wireless networks are available for networking data processing systems, as well as communication devices. Wired networks utilize physical wires that can carry electrical data signals for connecting data processing systems and communication devices to communicate over the network. Wireless networks generally utilize radio waves for connecting the data processing systems and communication devices to the network in a wireless manner.

Various communication devices are capable of communicating with each other using a variety of networks. Some communication devices are able to communicate using analog signals over analog communication networks. Other communication devices, such as a voice over Internet Protocol (VOIP) enabled telephone, communicate over wired or wireless data networks.

With the advent of VOIP, voice telephony delivered over a broadband network has become a popular service. For VOIP service, a VOIP service provider may place a VOIP-enabled communication device at the customer premises, and may require other broadband infrastructure within the customer's network to place or receive VOIP calls. This infrastructure may include broadband adapter and other devices. A broadband adapter is a device that communicates with a broadband network on the service provider's side and communicates with Ethernet-based data networks on the user's side. Some examples of broadband adapters include digital subscriber line (DSL) modem and cable modem.

Communication devices that use analog signals generally use wired analog communication networks for telecommunication. In so using, a communication device connects to the wired analog communication network using wires. Generally, the wires are formed into a cable that includes several wires within it and include modular connectors at each end of the cable.

A modular connector, or connector, is a wiring element that enables connecting electrical wires to circuits and other electrical wires. A common example of a connector is the familiar clear plastic terminal at the end of a telephone cord that "clicks" into the wall outlet for a telephone connection. The clear plastic terminal at the end of the telephone cord is a male RJ11 connector. The wall outlet that the telephone cord clicks into is a female RJ11 connector. Another example of a connector is an RJ45 connector, which is a slightly larger terminal that looks much like the RJ11 connector and is often used as a terminal at the end of a networking cable. The male RJ45 connector connects with a female RJ45 connector that may be available in a wall outlet or at the end of another network cable.

Figure 1:
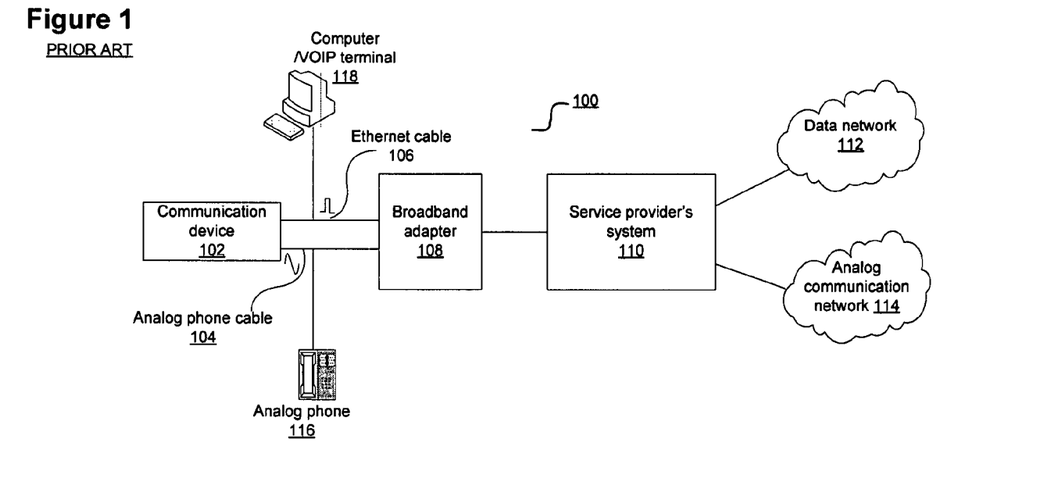
FIG. 1 is an exemplary diagram of an existing telecommunication environment.

FIG. 1 is an exemplary diagram of an existing telecommunication environment. Telecommunication environment 100 includes communication device 102 which is capable of conducting analog telecommunication using analog phone cable 104, as well as data communication using Ethernet cable 106. Both, analog phone cable 104 and Ethernet cable 106 are coupled to broadband adapter 108. Coupling cables in the manner of FIG. 1 include connecting the cables to the described devices and connecting the cables to the described devices via one or more intermediary devices. Furthermore, the connections may utilize connectors which may fit into corresponding jacks, sockets, ports, female connectors, splitters, connector adapters, switches, bridges, or hubs. For example, a port is a receptacle for a connector such that some or all the connections in a connector match with corresponding connections in the receptacle.

Broadband adapter 108 may be in communication with service provider's system 110. Communication between broadband adapter service provider's system 110 may be wired or wireless. Service provider's system 110 communicates with data network 112 and analog communication network 114 and provides broadband adapter 108 access to each of those networks.

The circuitry of broadband adapter 108 that is coupled to communication device 102 is the user's side of broadband adapter 108. The circuitry of broadband adapter 108 that is in communication with service provider's system 110 is the service provider's side of broadband adapter 108.

Other devices may be in communication with broadband adapter 108 on the user's side of broadband adapter 108. FIG. 1 shows exemplary analog phone 116 coupled to broadband adapter 108, such as by using a splitter on analog phone cable 104. FIG. 1 also shows exemplary computer 118 coupled to broadband adapter 108, such as by using a hub on Ethernet cable 106.

SUMMARY

To enable a user to use an existing data cable coupled to a communication device for conducting analog communication, the illustrative embodiments provide a method and system for conducting analog communication. A first set of wires is coupled to a data network carrying a data signal. A second set of wires is coupled to an analog communication network carrying an analog signal. A single connector having several connections is coupled to the first and second sets of wires. A port in a communication device is coupled to the connector and the communication device communicates the data signal over the first set of wires and the analog signal over the second set of wires.

In another system of the illustrative embodiments a first set of wires is coupled to a data network. A second set of wires is coupled to an analog communication network. A single connector is coupled to the first and the second sets of wires. The connector has several connections that carry a data signal. A port in a communication device is coupled to the connector. A filter filters an incoming analog signal from an incoming signal on a subset of connections in the several connections. That subset of connections carry both the data signal and an analog signal. A multiplexer multiplexes an outgoing analog signal with an outgoing data signal on that subset of connections. The communication device uses the subset of connections for analog communication and the several connections for data communication.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

DETAILED DESCRIPTION OF THE DRAWINGS

Communication devices are now available that are capable of communicating over analog communication networks, as well as data networks for providing analog voice communications and additional capabilities. Communication devices that include both analog and data capabilities usually require multiple cables to connect to the analog communication network and the data network. Illustrative embodiments recognize that users of such communication devices would prefer minimized cabling for a variety of reasons. For example, a user may not have multiple cables running from a broadband adapter to the communication device in the user's home and adding cabling can be an expensive proposition. As another example, a multiplicity of cables increases the complexity of managing and relocating the devices.

Therefore, the illustrative embodiments provide a method and apparatus for minimizing the cabling between a broadband adapter and a communication device. For the purposes of clarity of description, the illustrative embodiments are described with respect to a DSL modem as the broadband adapter. Further, for the purposes of the illustrative embodiments, a communication device may be any of the above examples of communication devices, and any other device or application usable for similar purposes, being capable of conducting both analog telecommunication and data communication.

Furthermore, by using the illustrative embodiments described below, a user may also be able to augment or replace the analog telecommunication service with VOIP service. The user may be able to make this augmentation or replacement without having to replace the communication device or modifying wiring at the customer premises. For example, the communication device may be able to work as a multi-line phone having access to both analog telecommunication service and VOIP service. Many other uses, advantages, and benefits will become apparent from this disclosure. An implementation of the particular embodiment described below may have some, all, or none of the uses, advantages, or benefits exemplarily described above.

The illustrative embodiments describe two alternative configurations of cabling between a communication device and a broadband adapter. A communication device may use either of these alternative configurations to connect with a broadband adapter. For carrying an analog signal, such as for analog communication, a first configuration uses wires in a cable that are not used for data signals. In this configuration, data signals and analog signals are carried on separate wires within the same cable. A second configuration uses the same wires in a cable for carrying both the data and the analog signals. To enable the use of the same wires as in the second configuration, filtering and multiplexing of data signals and analog signals may be performed.

FIGS. 2A-2D described below may be implemented using either of the two alternative configurations. FIGS. 4 and 6A are directed towards the first configuration where the analog and data signals are carried on separate wires within the same cable. FIGS. 3, 5, 4B, and 6B are directed towards the second configuration where the analog and data signals are carried on the same wires within the same cable.

Figure 2A:
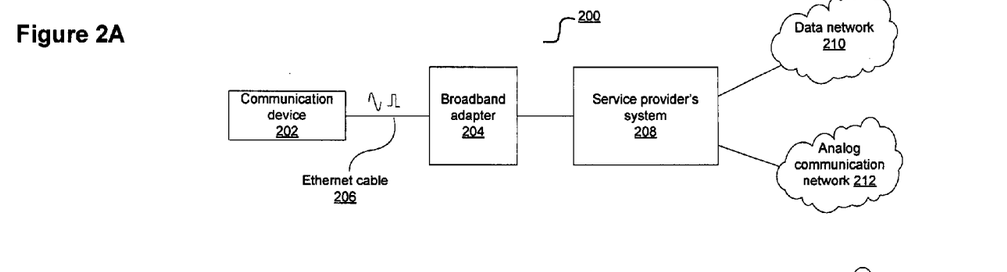
FIG. 2A depicts a telecommunication environment in accordance with an illustrative embodiment.

With reference to the figures, and in particular with reference to FIG. 2A, this figure depicts a telecommunication environment in accordance with an illustrative embodiment. Telecommunication environment 200 may be implemented using telecommunication environment 100 in FIG. 1.

Communication device 202 is shown coupled with broadband adapter 204 using Ethernet cable 206. Communication device 202 and broadband adapter 204 include features of illustrative embodiments described below in detail with respect to FIGS. 3-5. Configured in this manner, communication device 202 and broadband adapter 204 may communicate with each other using a single cable, Ethernet cable 206, as opposed to multiple cables as shown in FIG. 1.

Broadband adapter 204 may be in communication with service provider's system 208. Communication between broadband adapter 204 and service provider's system 208 may be wired or wireless. Service provider's system 208 may communicate with data network 210 and analog communication network 212 and provide communication device 202 access to each of those networks through broadband adapter 204.

Figure 2B:
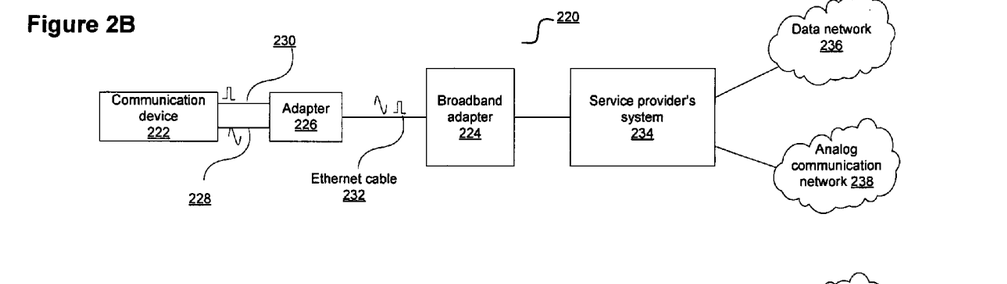
FIG. 2B depicts a telecommunication environment in accordance with an illustrative embodiment.

With reference to FIG. 2B, this figure depicts a telecommunication environment in accordance with an illustrative embodiment. Telecommunication environment 220 is an alternative configuration of telecommunication environment 200 in FIG. 2A, and illustrates a configuration where an existing communication device may be adapted to use the illustrative embodiments. Communication device 222 may communicate with broadband adapter 224 via adapter 226. Communication device 222 may be coupled to adapter 226 using multiple cables 228 and 230, similar to cables 104 and 106 in FIG. 1. Adapter 226 may be physically situated proximate to communication device 222 such that the cables 228 and 230 coupling the two devices may extend only a short distance, such as within the area of an office desk. Configured in this manner, only one cable extends the longer distance, such as through the walls of a house or an office building to couple broadband adapter 224 and adapted communication device 222. An adapted communication device is an existing communication device coupled with an adapter of the illustrative embodiments in the manner described above.

Adapter 226 is coupled with broadband adapter 224 using Ethernet cable 232 in a manner similar to the coupling between communication device 202 and broadband adapter 204 in FIG. 2A. The length of Ethernet cable 232 is longer than the length of cables 228 and 230 as described above. Service provider's system 234, data network 236, and analog communication network 238 correspond with similar entities depicted in FIG. 2A and are similarly configured with respect to broadband adapter 224.

Configured in this manner, telecommunication environment 220 may accommodate existing communication devices that are analog and data enabled, but presently require two cables to connect to a broadband adapter in the manner of FIG. 1. Adapter 226 may be coupled with such existing communication devices to implement the features of illustrative embodiments. Adapter 226 includes some of the features of illustrative embodiments described in FIGS. 3-5 below. Adapter 226 imparts those features to communication device 222 such that telecommunication environment 220 may be functionally equivalent to telecommunication environment 200 in FIG. 2A.

Figure 2C:
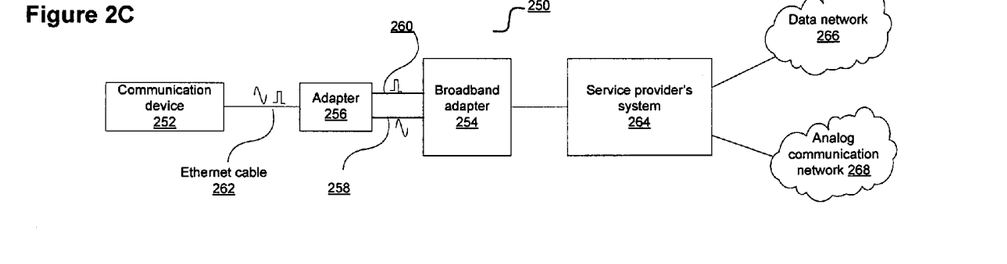
FIG. 2C depicts a telecommunication environment in accordance with an illustrative embodiment.

With reference to FIG. 2C, this figure depicts a telecommunication environment in accordance with an illustrative embodiment. Telecommunication environment 250 is an alternative configuration of telecommunication environment 200 in FIG. 2A, and illustrates a configuration where an existing broadband adapter may be adapted to use the illustrative embodiments. Communication device 252 may be coupled to broadband adapter 254 via adapter 256. Broadband adapter 254 may be coupled to adapter 256 using multiple cables 258 and 260, similar to cables 104 and 106 in FIG. 1. Adapter 256 may be physically situated proximate to broadband adapter 254 such that the cables coupling the two devices may extend only a short distance, such as within the area of a telecommunication closet. The length of Ethernet cable 262 is longer than the length of cables 258 and 260, such as across the walls of a home or an office. Configured in this manner, only one cable extends the longer distance to couple adapted broadband adapter 254 and communication device 252. An adapted broadband adapter is an existing broadband adapter coupled with an adapter of the illustrative embodiments in the manner described above.

Adapter 256 may be coupled with communication device 252 using Ethernet cable 262 in a manner similar to the coupling between communication device 202 and broadband adapter 204 in FIG. 2A. Service provider's system 264, data network 266, and analog communication network 268 correspond with similar entities depicted in FIG. 2A and are similarly configured with respect to broadband adapter 254.

Configured in this manner, telecommunication environment 250 may accommodate existing broadband adapters that are analog and data enabled, but presently require two cables to connect to a broadband adapter in the manner of FIG. 1. Adapter 256 may be coupled with such existing broadband adapters to implement the features of illustrative embodiments. Adapter 256 may include some of the features of illustrative embodiments described in FIGS. 3-5 below. Adapter 256 imparts those features to broadband adapter 254 such that telecommunication environment 250 is functionally equivalent to telecommunication environment 200 in FIG. 2A.

Figure 2D:
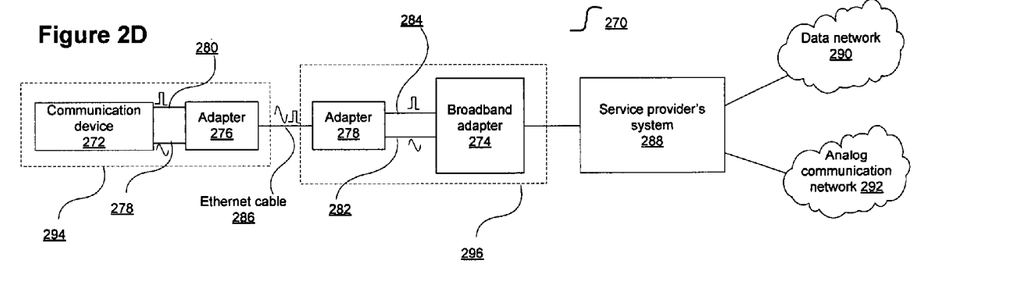
FIG. 2D depicts a telecommunication environment in accordance with an illustrative embodiment.

With reference to FIG. 2D, this figure depicts a telecommunication environment in accordance with an illustrative embodiment. Telecommunication environment 270 is an alternative configuration of telecommunication environment 200 in FIG. 2A, and illustrates a configuration where an existing communication device and an existing broadband adapter may be adapted to use the illustrative embodiments. Communication device 272 may be coupled to broadband adapter 274 via adapters 276 and 278. Communication device 272 may be coupled to adapter 276 using multiple cables 278 and 280, similar to cables 104 and 106 in FIG. 1. Broadband adapter 274 may be coupled to adapter 278 using multiple cables 282 and 284, similar to cables 104 and 106 in FIG. 1.

Adapter 276 may be physically situated proximate to communication device 272 such that the cables coupling the two devices may extend a short distance, such as within the area of an office desk. Adapter 278 may be physically situated proximate to broadband adapter 274 such that the cables coupling the two devices may extend a short distance, such as within the area of a telecommunication closet.

Adapter 276 is coupled with adapter 278 using Ethernet cable 286 in a manner similar to the coupling between communication device 202 and broadband adapter 204 in FIG. 2A. The length of Ethernet cable 286 is longer than the length of cables 278, 280, 282, and 284 such that Ethernet cable 286 may extend as across the walls of a home or an office. Configured in this manner, only one cable extends the longer distance to couple adapted broadband adapter 274 and adapted communication device 272. Service provider's system 288, data network 290 and analog communication network 292 correspond with similar entities depicted in FIG. 2 and are similarly configured with respect to broadband adapter 274.

Configured in this manner, telecommunication environment 270 may accommodate existing communication devices and broadband adapters that are analog and data enabled, but do not include the features of illustrative embodiments described in FIGS. 3-5 below. Adapters 276 and 278 may be coupled with such existing communication devices and broadband adapters, respectively, to implement the features of illustrative embodiments. Adapters 276 and 278 include the features of illustrative embodiments described in FIGS. 3-5 below. Adapters 276 and 278 impart those features to communication device 272 and broadband adapter 274, respectively, such that telecommunication environment 270 may be functionally equivalent to telecommunication environment 200 in FIG. 2A.

Furthermore, existing communication device 272 and adapter 276 may be combined in a single enclosure, such as enclosure 294, to result in a communication device that is functionally similar to communication device 202 in FIG. 2A. Similarly, existing broadband adapter 274 and adapter 278 may be combined in a single enclosure, such as enclosure 296, to result in a broadband adapter that may be functionally similar to broadband adapter 204 in FIG. 2A.

The various combinations of the communication devices according to the illustrative embodiments, existing communication devices, broadband adapters according to the illustrative embodiments, existing broadband adapters, adapters according to the illustrative embodiments, and the various enclosures are described in FIGS. 2A-2D only as exemplary and are not limiting on the illustrative embodiments. Other features may be included and other combinations may be made in particular implementations of the illustrative embodiments.

Figure 3:
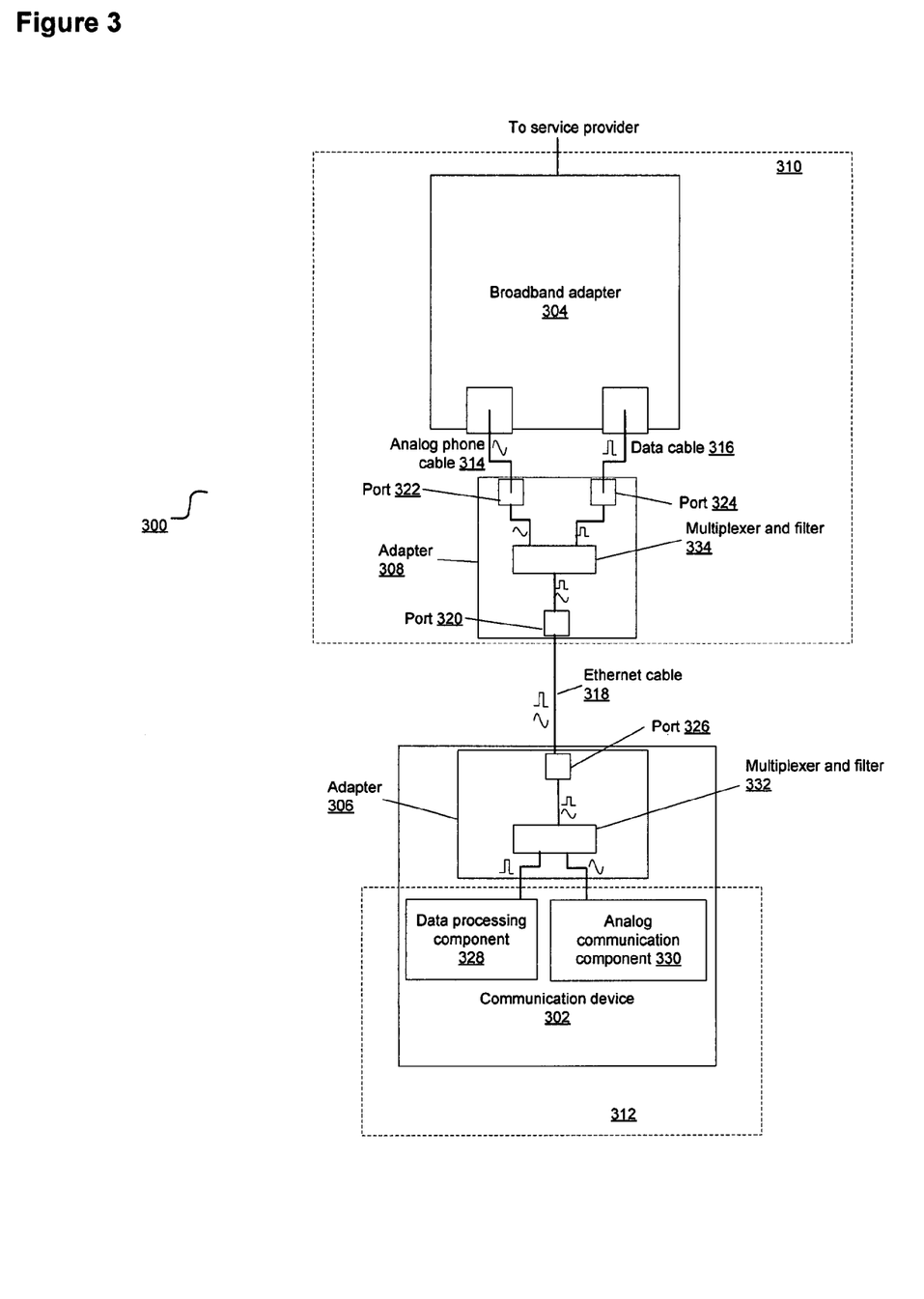
FIG. 3 depicts a detailed block diagram of various devices in a telecommunication configuration in accordance with an illustrative embodiment.
Figure 4:
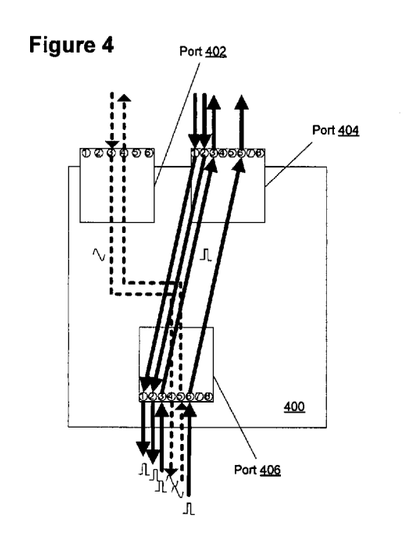
FIG. 4 depicts a multiplexing and filtering scheme within an adapter in accordance with an illustrative embodiment.

With reference to FIG. 3, this figure depicts a detailed block diagram of various devices in a telecommunication configuration in accordance with an illustrative embodiment. Configuration 300 may be implemented in telecommunication environment 250 in FIG. 2C, which depicts a communication device improved in accordance with the illustrative embodiments and an adapted existing broadband adapter coupled in a configuration similar to configuration 300.

Communication device 302 may be the same as communication device 202 in FIG. 2A or 252 in FIG. 2C. Broadband adapter 304 may be the same as broadband adapter 254 in FIG. 2C. Adapter 306 may be the same as adapter 276 in FIG. 2D. Adapter 308 may be the same as adapter 256 in FIG. 2C or 278 in FIG. 2D.

Broadband adapter 304 may be an existing broadband adapter and may be combined with adapter 308 as enclosure 310. Enclosure 310 may be implemented as enclosure 296 in FIG. 2D. Adapter 306 is depicted as being within communication device 302 only as exemplary. Communication device 302 may be an existing communication device, depicted as enclosure 312, and may be combined with adapter 306 to form communication device 302. Communication device 302 may be implemented as enclosure 294 in FIG. 2D.

Adapter 308 may be coupled with broadband adapter 304 using analog phone cable 314 and data cable 316, which may be an Ethernet cable. Communication device 302 may be coupled to adapter 308 using Ethernet cable 318.

Generally, an adapter that is external to an existing device, such as an existing broadband adapter or an existing communication device, may include ports for ease of coupling cabling to the adapter. In the exemplary depiction of FIG. 3, adapter 308 may be an external adapter. Adapter 308 is shown to include ports 320, 322, and 324. Port 320 may receive Ethernet cable 318, port 322 may receive analog phone cable 314, and port 324 may receive data cable 316.

When an adapter is internal to a device, as in exemplary communication device 302, the adapter may or may not couple with other components within the device using ports. For example, adapter 306 is shown to include port 326, which may appear to be, or double as, a port of communication device 302. Adapter 306 may be coupled to other components within communication device 302, such as data processing component 328 and analog communication component 330, without ports. A coupling without using ports may be accomplished, for example, by coupling to conducting channels or pins on a circuit board.

Note that a cable coupling with a port may include multiple wires. Each port may provide one or more connections such that one or more wires of a cable may be connected to each of those connections.

Signals received on multiple ports may be combined, or multiplexed, onto a single port. Conversely, signals received on a single port may be separated, or filtered, to separate ports. Similarly, signals received on multiple wires may be multiplexed onto a single wire, and signals received on one wire may be filtered to separate wires.

Adapter 306 includes multiplexer and filter 332. Multiplexer and filter 332 multiplexes the signals flowing from data processing component 328 and analog communication component 330 to port 326, and filters the signals flowing from port 326 to data processing component 328 and analog communication component 330. Likewise, adapter 308 includes multiplexer and filter 334. Multiplexer and filter 334 multiplexes the signals flowing from ports 322 and 324 to port 320, and filters the signals flowing from port 320 to ports 322 and 324 to place those signals on analog phone cable 314 and data cable 316, respectively.

Multiplexing and filtering of analog and data signals with/from one another is generally achievable because the two signals occupy different frequency bands. As an example, analog signals may occupy a 0-4000 Hz frequency band, whereas data signals may occupy a 8000 Hz and up band of frequencies. Signals in different frequency bands may be multiplexed with each other in a way that those signals can be filtered from one another without any significant loss of content of the signals.

In one embodiment, multiplexing includes placing different signals on different wires within a cable. In another embodiment, multiplexing includes placing different signals on one wire by combining the different signals. An embodiment may multiplex signals using both multiplexing methods.

In one embodiment, filtering includes the use of a low-pass filter. A low-pass filter is a filter that allows signals at a low range of frequencies to pass through and blocks the signals at a high range of frequencies from passing. For example, a low-pass filter may allow signals within a 0-4000 h frequency band to pass and block signals at frequencies above 4000 Hz. In another embodiment, filtering includes the use of a high-pass filter. A high-pass filter is a filter that allows signals at a high range of frequencies to pass through and blocks the signals at a low range of frequencies. For example, a high-pass filter may allow signals at frequencies above 4000 Hz to pass and block signals at frequencies between 0 and 4000 Hz from passing. An embodiment may use both a low-pass filter and a high-pass filter to separately pass analog signals and data signals, thus effectively filtering one from the other. In yet another embodiment, a band-pass filter may be used. A band-pass filter allows signals within a specified frequency band to pass and blocks the signals at frequencies outside of the specified frequency band.

With reference to FIG. 4, this figure depicts a multiplexing and filtering scheme within an adapter in accordance with an illustrative embodiment. Adapter 400 may be the same as adapter 308 in FIG. 3.

Adapter 400 includes port 402 that may be configured to receive and send analog signals, such as when coupled with an analog phone cable. Port 402 is similar to port 322 in FIG. 3. Adapter 400 further includes port 404, which may be configured to receive and send data signals, such as when coupled with data cable. Port 404 is similar to port 324 in FIG. 3. Adapter 400 also includes port 406 which may be configured to receive and send both analog and data signals, such as when coupled with Ethernet cable in accordance with an illustrative embodiment. Port 406 is similar to port 320 in FIG. 3. The circled numbers within each port indicate the number of position of connections within that port to which wires of cables may be connected.

An incoming signal is a signal that is directed towards a communication device to which adapter 400 may be coupled. Conversely, an outgoing signal is a signal directed away from the communication device to which adapter 400 may be coupled. Data signals and analog signals can each be incoming or outgoing depending on their direction with respect to the communication device.

Each of ports 402-406 may have a separate cable coupled to it, and each cable coupled in this manner includes several wires. Adapter 400 may include the multiplexing scheme where different signals from different cables are placed on different wires of a single cable. For example, incoming data signals (shown as a step signal) may be received on a first set of wires connected to connections 1 and 2 of port 404. An incoming analog signal (shown as a sinusoidal wave signal) may be received on a second set of wires connected to connection 3 of port 402. A set of wires is one or more wires. Adapter 400 multiplexes the two incoming signals on connections 1, 2 and 4 of port 406 such that data signals are placed on connections 1 and 2, and the analog signal is placed on connection 4 of port 406. In effect, the analog signal from connection 3 of port 402 may be combined with a null signal on connection 4 of port 406. A null signal is a signal with zero useful value. A useful value of a signal is the value that is intended in the signal. For example, no signal is a null signal. As another example, a signal that contains only noise is a null signal.

Similarly, adapter 400 may include a filtering scheme where signals on separate wires of a cable may be placed on separate wires of separate cables. In adapter 400, outgoing data signals may be received on connections 3, 5, and 6 of port 406, such that connections 3 and 6 carry the outgoing data signals and connection 5 carries the outgoing analog signal. Adapter 400 may filter the two outgoing signals and sends the filtered data signals on connections 3 and 6 of port 404, and the filtered outgoing analog signal is sent on connection 4 of port 402. Filtered signals are signals separated from a combined signal. A filtered data signal is a data signal filtered from a combined data and analog signal. Similarly, a filtered analog signal is an analog signal that is filtered from a combined data and analog signal.

Figure 5:
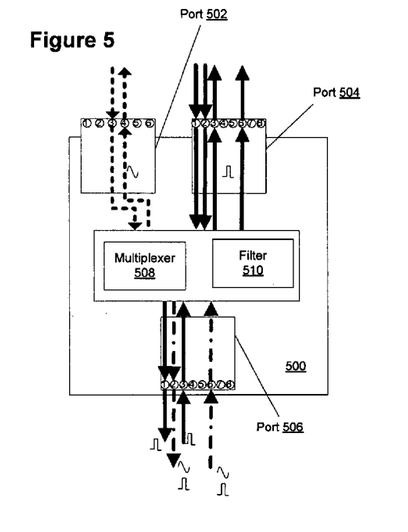
FIG. 5 depicts a second multiplexing and filtering scheme within an adapter in accordance with an illustrative embodiment.

With reference to FIG. 5, this figure depicts a second multiplexing and filtering scheme within an adapter in accordance with an illustrative embodiment. Adapter 500 may be implemented as adapter 308 in FIG. 3.

Adapter 500 includes port 502 which may be configured to receive and send analog signals, such as when coupled with an analog phone cable. Port 502 is similar to port 322 in FIG. 3. Adapter 500 further includes port 504 which may be configured to receive and send data signals, such as when coupled with data cable. Port 504 is similar to port 324 in FIG. 3. Adapter 500 also includes port 506 which may be configured to receive and send both analog and data signals, such as when coupled with Ethernet cable in accordance with an illustrative embodiment. Port 506 is similar to port 320 in FIG. 3. The circled numbers within each port indicate the number of position of connections within that port to which wires of cables may be connected.

One cable is coupled with each of ports 502-506, and each cable coupled in this manner includes several wires. Adapter 500 includes multiplexer 508 that implements a multiplexing scheme where different signals from different cables are combined and placed on the same wires of a single cable. For example, incoming data signals are received on connections 1 and 2 of port 504 and the incoming analog signal is received on connection 3 of port 502. Adapter 500 exemplarily multiplexes the incoming signals such that only the data signal of connection 1 of port 504 is placed on connection 1 of port 506; and multiplexed signals of connection 2 of port 504 and connection 3 of port 502 are placed on connection 2 of port 506. Thus, the set of wires that carries the analog signal is a subset of the set of wires that carries the data signal.

Similarly, adapter 500 includes filter 510 that implements a filtering scheme where signals on a single wire of a single cable are filtered, and the analog and data signals are placed on separate wires of separate cables. In adapter 500, outgoing data signals are received on connections 3 and 6 of port 506 such that connection 3 carries the combined outgoing data and analog signals, and connection 6 carries only the outgoing data signal. Adapter 500 filters the two outgoing signals on connection 3 of port 506 and sends the data signal on connection 3 of port 504 and sends the outgoing analog signal on connection 4 of port 502. Adapter 500 passes the data signal on connection 6 of port 506 to connection 6 of port 504. Adapter 500 may use low-pass filters, high-pass filters, both types of filters, or other types of filters for filtering the analog and data signals.

Note that the multiplexing and filtering schemes of FIGS. 4-5 are described only as exemplary and are not limiting on the illustrative embodiments. Any other method of multiplexing and filtering the data and analog signals may be employed in adapters 400 and 500 without departing from the scope of the illustrative embodiments. Furthermore, the specific connections in each port are selected in each embodiment only for illustrative purposes. Any connection in the appropriate port may be selected for carrying inbound, outbound, and multiplexed signals.

Figure 6:
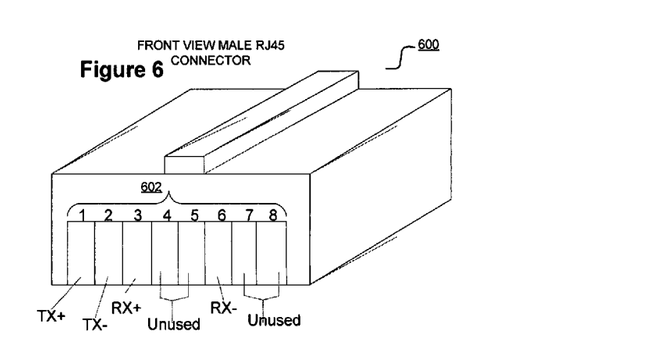
FIG. 6 depicts a male RJ45 connector that may be used for coupling a cable with a communication device in accordance with an illustrative embodiment.
Figure 6A:
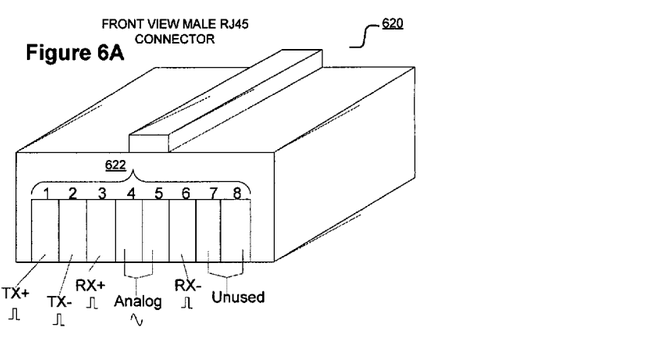
FIG. 6A depicts a configuration of a male RJ45 connector in accordance with an illustrative embodiment.

With reference to FIG. 6, this figure depicts a male RJ45 connector that may be used for coupling a cable with a communication device in accordance with an illustrative embodiment. Connector 600 is a cable connector that may be affixed to an end of a cable providing electrical connectivity to up to eight wires in the cable. Connector 600 is commonly known as a male RJ45 connector and is commonly affixed to Ethernet cables having eight wires in four twisted pairs.

Connections 602 are numbered 1-8, each connection connecting to one wire in an Ethernet cable or other cable. Connections 602 may be connected to wires carrying a variety of signals according to any one of many standards that specify the connector configurations. These standards are the predefined configurations of the connector. Some examples of such pre-defined configurations are those provided by the telecommunications Industry Association (TIA) and Electronic Industries Alliance (EIA), such as the TIA/EIA 568-A and 568-B standards.

When connected to an Ethernet cable according to the TIA/EIA 568-B standard, connections 1 and 2 in connections 602 and the corresponding wires are used for transmitting data, connection 3 and 6 and the corresponding wires are used for receiving data, and connections 4, 5, 7, and 8 and the corresponding wires are unused. If a connector configured in the manner of connector 600 is used to couple an Ethernet cable with port 406 in FIG. 4, an analog signal is available on the set of otherwise unused connections and wires. A set of unused wires is one or more unused wires. A set of unused connections is one or more unused connections.

With reference to FIG. 6A, this figure depicts a configuration of a male RJ45 connector in accordance with an illustrative embodiment. Connector 620 may be the same as connector 600 in FIG. 6. Connections 1, 2, 3, and 6 in connections 622 are configured similar to the corresponding connections in FIG. 6. Connections 4 and 5 in connections 622, however, that were depicted as unused in FIG. 6, are now used for carrying analog signals. Connections 7 and 8 in connections 622 remain unused as in FIG. 6. Note that unused connections 7 and 8 may be used in place of connections 4 and 5 to carry the analog signals.

Figure 6B:
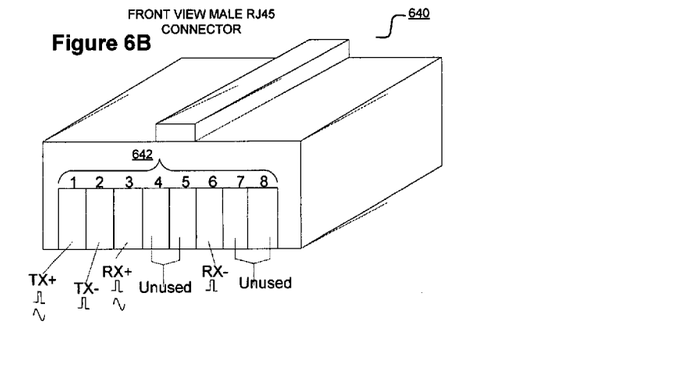
FIG. 6B depicts a second configuration of a male RJ45 connector in accordance with an illustrative embodiment.

With reference to FIG. 6B, this figure depicts a second configuration of a male RJ45 connector in accordance with an illustrative embodiment. Connector 640 may be the same as connector 600 in FIG. 6. Connections 1, 2, 3, and 6 in connections 622 are configured similar to the corresponding connections in FIG. 6. However, connections 1 and 3 are now also used for carrying analog signals. Thus, connections 1 and 3 carry both data and analog signals, connections 2 and 6 carry only data signals, and connections 4, 5, 7, and 8 remain unused in connections 642.

Figure 7:
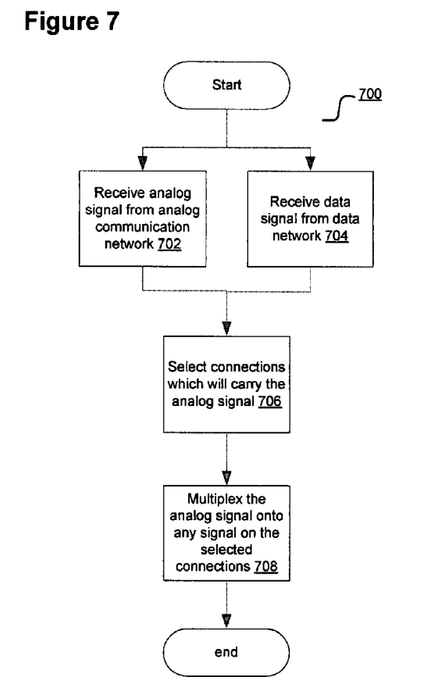
FIG. 7 depicts a flowchart of a process of multiplexing data and analog signals in accordance with an illustrative embodiment.

With reference to FIG. 7, this figure depicts a flowchart of a process of multiplexing data and analog signals in accordance with an illustrative embodiment. Process 700 may be implemented in adapter 400 in FIG. 4 or adapter 500 in FIG. 5.

Process 700 begins by receiving data and analog signals. The process receives an analog signal from analog communication network (step 702). The process receives the data signal from data network (step 704). The process may receive these inbound signals in any order.

Once the inbound analog and data signals are available, the process selects the connections that will carry the analog signal (step 706). The process then multiplexes the analog signal with the data signal or any other signal that those selected connections may carry (step 708). The process ends thereafter.

Figure 8:
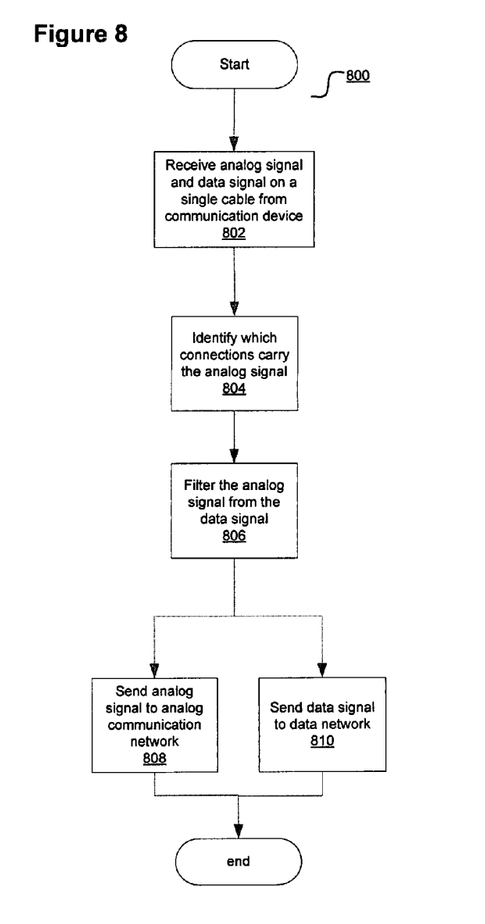
FIG. 8 depicts a flowchart of a process of filtering data and analog signals in accordance with an illustrative embodiment.

With reference to FIG. 8, this figure depicts a flowchart of a process of filtering data and analog signals in accordance with an illustrative embodiment. Process 800 may be implemented in adapter 400 in FIG. 4 or adapter 500 in FIG. 5.

Process 800 begins by receiving data and analog signals on a single cable from a communication device (step 802). Once the outbound analog and data signals are available, the process identifies the connections that carry the analog signal (step 804). The process then filters the analog signal from the data signal or any other signal that those selected connections may carry (step 806). The process sends the analog signal to the analog communication network (step 808). The process sends the data signal to the data network (step 810). The process may send these signals to their respective networks in any order. The process ends thereafter.

The various steps of the processes in FIGS. 7 and 8 are described only as exemplary. A particular implementation of these processes may combine, further subdivide, augment, enhance, supplement, or modify these steps as needed without departing from the scope of the illustrative embodiments.

Thus, in the illustrative embodiments described above, a method and apparatus provides for conducting analog telecommunication over Ethernet. Using the illustrative embodiments, a communication device and communication infrastructure at a user's premises is simplified. The illustrative embodiments may reduce the number of cables running between the various devices that facilitate analog communication. The illustrative embodiments may also enable a user to add data features to a communication device of the illustrative embodiments without having to replace the communication device. The illustrative embodiments may also provide a transparent switchover from analog communication to VOIP or other data-based communication without the need for rewiring or new equipment.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example, without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed is:

1. A system for conduction analog communication, comprising:
   a communication device;
   a cable including a plurality of wires;
   a broadband adapter coupled to the communication device using the cable such that the cable carries an analog signal and a data signal between the communication device and the broadband adapter; and
   an adapter configured to (i) couple to the cable on one port and to the communication device using a separate plurality of ports, (ii) to identify a first set of wires in the plurality of wires carrying a data signal, (iii) to connect the set of wires to a data port in the plurality of ports, (iv) to identify a second set of wires carrying an analog signal, and (v) to connect the second set of wires to an analog port in the plurality of ports.

2. A system for conduction analog communication, comprising:
- a communication device;
- a cable including a plurality of wires;
- a broadband adapter coupled to the communication device using the cable such that the cable carries an analog signal and a data signal between the communication device and the broadband adapter; and
- an adapter configured to (i) couple to the cable on one port and to the broadband adapter using a separate plurality of ports, (ii) to identify a first set of wires in the plurality of wires carrying a data signal, (iii) to connect the set of wires to a data port in the plurality of ports, (iv) to identify a second set of wires carrying an analog signal, and (v) to connect the second set of wires to an analog port in the plurality of ports.

3. A system for conduction analog communication, comprising:
- a communication device;
- a cable including a plurality of wires;
- a broadband adapter coupled to the communication device using the cable such that the cable carries an analog signal and a data signal between the communication device and the broadband adapter; and
- an adapter configured to couple to the cable on one port and to the communication device using a separate plurality of ports, the adapter including:
  - a set of filters configured to (i) filter an incoming analog signal on the cable and direct the incoming analog signal to an analog port in the plurality of ports, (ii) to filter an incoming data signal on the plurality of wires, and (iii) to direct the incoming data signal to a data port in the plurality of ports; and
  - a multiplexer configured to (i) multiplex an outgoing analog signal on the analog port with an outgoing data signal on the data port to form a multiplexed signal and (ii) to direct the multiplexed signal to the port coupled to the cable.

* * * * *